(12) United States Patent
Krishan et al.

(10) Patent No.: US 12,015,923 B2
(45) Date of Patent: Jun. 18, 2024

(54) METHODS, SYSTEMS, AND COMPUTER READABLE MEDIA FOR MITIGATING EFFECTS OF ACCESS TOKEN MISUSE

(71) Applicant: Oracle International Corporation, Redwood Shores, CA (US)

(72) Inventors: Rajiv Krishan, Bangalore (IN); Doki Satish Kumar Patro, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/557,324

(22) Filed: Dec. 21, 2021

(65) Prior Publication Data
US 2023/0199497 A1 Jun. 22, 2023

(51) Int. Cl.
| | |
|---|---|
| H04L 9/00 | (2022.01) |
| H04L 9/40 | (2022.01) |
| H04W 12/084 | (2021.01) |
| H04W 12/122 | (2021.01) |

(52) U.S. Cl.
CPC ....... *H04W 12/122* (2021.01); *H04L 63/0281* (2013.01); *H04W 12/084* (2021.01)

(58) Field of Classification Search
CPC ............ H04L 63/0281; H04W 12/084; H04W 12/122
USPC ......................................................... 726/12
See application file for complete search history.

(56) References Cited

U.S. PATENT DOCUMENTS

| | | | |
|---|---|---|---|
| 8,509,074 B1 | 8/2013 | Roberts et al. | |
| 8,955,045 B2 * | 2/2015 | Smith ..................... | H04L 63/08 726/1 |
| 9,106,428 B2 | 8/2015 | Matthews et al. | |
| 9,654,483 B1 * | 5/2017 | Benson ............... | H04L 63/1466 |
| 9,912,486 B1 | 3/2018 | Sharifi Mehr | |
| 10,168,413 B2 | 1/2019 | Annamalai et al. | |
| 11,528,251 B2 | 12/2022 | Rajput et al. | |
| 2002/0080752 A1 | 6/2002 | Johansson et al. | |
| 2007/0165527 A1 | 7/2007 | Sultan et al. | |
| 2007/0165626 A1 | 7/2007 | Sultan et al. | |

(Continued)

FOREIGN PATENT DOCUMENTS

| | | |
|---|---|---|
| WO | WO 2020/053481 A1 | 3/2020 |
| WO | WO 2022/098404 A1 | 5/2022 |
| WO | WO 2022/235462 A1 | 11/2022 |

OTHER PUBLICATIONS

First Examination Report for Indian Patent Application Serial No. 202347028254 (dated Nov. 15, 2023).

(Continued)

*Primary Examiner* — Josnel Jeudy
(74) *Attorney, Agent, or Firm* — Jenkins, Taylor & Hunt, P.A.

(57) ABSTRACT

Methods, systems, and computer readable media for mitigating effects of access token misuse are disclosed. One example method for mitigating effects of access token misuse comprises: at a network function (NF) comprising at least one processor: receiving, from a sender, a service request comprising an access token, wherein the access token includes an access token identifier and usage attributes indicating a message rate limit and/or a message count limit; determining, using the usage attributes associated with the access token, that the service request should be rejected; and rejecting the service request.

18 Claims, 9 Drawing Sheets

(56) References Cited

U.S. PATENT DOCUMENTS

| | | | |
|---|---|---|---|
| 2007/0223372 A1 | 9/2007 | Haalen et al. | |
| 2008/0259798 A1 | 10/2008 | Loh et al. | |
| 2010/0098414 A1 | 4/2010 | Kramer et al. | |
| 2012/0144501 A1* | 6/2012 | Vangpat | H04L 63/108 726/28 |
| 2012/0226813 A1* | 9/2012 | Ragusa | G06F 9/5027 709/227 |
| 2013/0039176 A1 | 2/2013 | Kanode et al. | |
| 2014/0195630 A1 | 7/2014 | Malik et al. | |
| 2014/0370922 A1 | 12/2014 | Richards | |
| 2015/0081579 A1 | 3/2015 | Brown et al. | |
| 2015/0121078 A1 | 4/2015 | Fu et al. | |
| 2015/0244486 A1 | 8/2015 | Liang et al. | |
| 2015/0304220 A1 | 10/2015 | Miyao | |
| 2015/0341341 A1 | 11/2015 | Messerges | |
| 2015/0350196 A1 | 12/2015 | Toyonaga et al. | |
| 2016/0183117 A1 | 6/2016 | Hsu et al. | |
| 2016/0219043 A1 | 7/2016 | Blanke | |
| 2016/0337976 A1 | 11/2016 | Wang et al. | |
| 2016/0365983 A1 | 12/2016 | Shahabuddin et al. | |
| 2017/0201778 A1 | 7/2017 | Bailey et al. | |
| 2017/0244676 A1 | 8/2017 | Edwards | |
| 2017/0257866 A1 | 9/2017 | Chaudhuri et al. | |
| 2017/0289048 A1 | 10/2017 | Chao et al. | |
| 2017/0330145 A1* | 11/2017 | Studnicka | G07C 9/00896 |
| 2017/0331828 A1* | 11/2017 | Caldera | H04L 63/0807 |
| 2018/0159780 A1 | 6/2018 | Essigmann et al. | |
| 2018/0270765 A1 | 9/2018 | Wang | |
| 2018/0288127 A1 | 10/2018 | Zaidi et al. | |
| 2018/0288198 A1 | 10/2018 | Pope et al. | |
| 2019/0074982 A1 | 3/2019 | Hughes | |
| 2019/0090086 A1 | 3/2019 | Graham et al. | |
| 2019/0253885 A1 | 8/2019 | Bykampadi et al. | |
| 2019/0306166 A1 | 10/2019 | Konda et al. | |
| 2019/0342217 A1 | 11/2019 | Mazurek | |
| 2019/0354709 A1 | 11/2019 | Brinskelle | |
| 2019/0364460 A1 | 11/2019 | Bogineni et al. | |
| 2020/0169510 A1 | 5/2020 | Kadosh et al. | |
| 2020/0186359 A1 | 6/2020 | Chan et al. | |
| 2021/0022070 A1 | 1/2021 | Letor et al. | |
| 2021/0111985 A1 | 4/2021 | Mahalank et al. | |
| 2021/0112012 A1 | 4/2021 | Krishan et al. | |
| 2021/0142143 A1 | 5/2021 | Howard | |
| 2021/0152494 A1 | 5/2021 | Johnsen et al. | |
| 2021/0176177 A1 | 6/2021 | Kubo et al. | |
| 2021/0194903 A1 | 6/2021 | Medvedovsky et al. | |
| 2021/0234673 A1* | 7/2021 | Kurian | H04L 9/3234 |
| 2021/0234706 A1 | 7/2021 | Nair et al. | |
| 2021/0250186 A1 | 8/2021 | Bykampadi et al. | |
| 2021/0258824 A1 | 8/2021 | John et al. | |
| 2021/0288802 A1 | 9/2021 | Muhanna et al. | |
| 2021/0297896 A1* | 9/2021 | Landais | H04L 69/22 |
| 2021/0297942 A1 | 9/2021 | Bykampadi et al. | |
| 2021/0321303 A1 | 10/2021 | Nair et al. | |
| 2021/0377212 A1 | 12/2021 | Holtmanns et al. | |
| 2021/0385085 A1* | 12/2021 | Wang | H04L 9/12 |
| 2021/0385216 A1* | 12/2021 | Khalil | H04L 9/3239 |
| 2021/0399988 A1 | 12/2021 | Labonte | |
| 2021/0406038 A1 | 12/2021 | Fetzer et al. | |
| 2022/0030413 A1 | 1/2022 | Ben Henda et al. | |
| 2022/0038394 A1 | 2/2022 | Anubolu et al. | |
| 2022/0052847 A1 | 2/2022 | Gonzalez Cervantes et al. | |
| 2022/0150212 A1 | 5/2022 | Rajput | |
| 2022/0159464 A1 | 5/2022 | Rajput et al. | |
| 2022/0182923 A1 | 6/2022 | Yao et al. | |
| 2022/0329409 A1* | 10/2022 | Collinge | G16Y 40/30 |
| 2022/0360989 A1 | 11/2022 | Rajput et al. | |
| 2023/0015697 A1* | 1/2023 | Krishnan | H04L 67/563 |

OTHER PUBLICATIONS

Notice of Allowance and Fee(s) Due and Examiner-Initiated Interview Summary for U.S. Appl. No. 17/129,487 (dated Jul. 25, 2022).

Non-Final Office Action for U.S. Appl. No. 17/129,487 (dated Mar. 21, 2022).

Nokia et al., "3gpp-Sbi-Consumer-Id," 3GPP TSG-CT WG4 Meeting #101e pp. 1-4 (Nov. 3-13, 2020).

Nokia et al., "SBA Network Function certificate profile," 3GPTT TSG-SA WG3 Meeting #98e pp. 1-5 (Mar. 2-6, 2020).

"3rd Generation Partnership Project; Technical Specification Group Services and System Aspects; Security Aspects; Study on security aspects of the 5G Service Based Architecture (SBA) (Release 16)," 3GPP TR 33.855, V1.3.0 pp. 1-52 (Nov. 2018).

Notification of Transmittal of the International Search Report and the Written Opinion of the International Searching Authority, or the Declaration for International Application No. PCT/US2021/042660 (dated Oct. 26, 2021).

Commonly-Assigned, co-pending U.S. Appl. No. 17/129,487 for "Methods, Systems, and Computer Readable Media for Ingress Message Rate Limiting," (Unpublished, filed Dec. 21, 2020).

Supplemental Notice of Allowability for U.S. Appl. No. 17/308,972 (dated Mar. 1, 2023).

Notice of Allowance and Fee(s) Due for U.S. Appl. No. 17/308,972 (dated Nov. 18, 2022).

Non-Final Office Action for U.S. Appl. No. 17/308,972 (dated Aug. 5, 2022).

Notification of Transmittal of the International Search Report and the Written Opinion of the International Searching Authority, or the Declaration for International Application No. PCT/US2022/026417 (dated Jul. 8, 2022).

Commonly-Assigned, co-pending U.S. Appl. No. 17/308,972 for "Methods, Systems, and Computer Readable Media for Generating and Using Single-Use Oauth 2.0 Access Tokens for Securing Specific Service-Based Architecture (SBA) Interfaces," (Unpublished, filed May 5, 2021).

"3rd Generation Partnership Project; Technical Specification Group Services and System Aspects; Security architecture and procedures for 5G system (Release 17)," 3GPP TS 33.501, V17.1.0, pp. 1-256 (Mar. 2021).

"3rd Generation Partnership Project; Technical Specification Group Services and System Aspects; Security Aspects; Study on security aspects of the 5G Service Based Architecture (SBA) (Release 16)," 3GPP TR 33.855, V16.0.0, pp. 1-131 (Jul. 2020).

Hardt, "The OAuth 2.0 Authorization Framework", Internet Engineering Task Force (IETF) Request for Comments (RFC) 6749, pp. 1-76 (2012).

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

"3rd Generation Partnership Project; Technical Specification Group Services and System Aspects; Security architecture and procedures for 5G system (Release 17)," 3GPP TS 33.501, V17.3.0, pp. 1-258 (Sep. 2021).

Jones et al., "JSON Web Token (JWT)," Internet Engineering Task Force (IETF), Request for Comments: 7519, pp. 1-30 (May 2015).

Commonly-Assigned, co-pending U.S. Appl. No. 17/987,820 for "Methods, Systems, and Computer Readable Media for Detecting Stolen Access Tokens," (Unpublished, filed Nov. 15, 2022).

Housley et al. "Internet X.509 Public Key Infrastructure Certificate and CRL Profile," Network Working Group, Request for Comments: 2459, pp. 1-129 (Jan. 1999).

"3rd Generation Partnership Project; Technical Specification Group Core Network and Terminals; 5G System; Network Function Repository Services: Stage 3 (Release 17)," 3GPP TS 29.510, V17.6.0, pp. 1-306 (Jun. 2022).

"3rd Generation Partnership Project; Technical Specification Group Services and System Aspects; Security architecture and procedures for 5G system (Release 17)," 3GPP TS 33.501, V17.7.0, pp. 1-292 (Sep. 2022).

* cited by examiner

500

| PRIORITY | NF TYPE | SUBGROUP TYPE | SUBGROUP VALUE | MESSAGE COUNT LIMIT | MESSAGE RATE LIMIT (MESSAGE PER SECONDS) | COMMENT/DESCRIPTION |
|---|---|---|---|---|---|---|
| 100 | * | * | * | 15,000 | 500 MPS | APPLIES IF NO OTHER ROW MATCHES (E.G., DEFAULT ROW) |
| 99 | SMF | * | * | 20,000 | 2000 MPS | APPLIES FOR ALL TOKENS ISSUED TO ANY SMF NF INSTANCE. IT ONLY APPLIES IF THERE IS NO SPECIFIC ROW FOR SMF NF TYPE AND MATCHING SUBGROUP TYPE AND VALUE |
| 5 | PCF | INSTANCE_ID | INST1 | 10,000 | 1000 MPS | APPLIES TO A NF WITH INSTANCE ID AS "INST1" OF PCF TYPE |
| 10 | PCF | LOCALITY | "LOCATION1" | 5,000 | 300 MPS | APPLIES TO A NF WITH LOCALITY SET TO "LOCATION1" OF PCF TYPE |

FIG. 5

METHODS, SYSTEMS, AND COMPUTER READABLE MEDIA FOR MITIGATING EFFECTS OF ACCESS TOKEN MISUSE

TECHNICAL FIELD

The subject matter described herein relates to security in telecommunications networks. More particularly, the subject matter described herein relates to methods, systems, and computer readable media for mitigating effects of access token misuse.

BACKGROUND

In fifth generation (5G) telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with an NF repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required services or directly routes the traffic to the destination producer NF instances.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks relates to security for specific service-based architecture (SBA) interfaces. The current security procedure defined in 3GPP TS 33.501 for accessing SBA interfaces is referred to as service access authorization. The messages used to access SBA interfaces are referred to as service-based interface (SBI) messages, and the services provided on the interfaces are referred to as SBI services. According to the service access authorization procedure, a consumer NF seeking to access an SBI service provided by a producer NF must obtain an OAuth 2.0 access token from the NRF. To obtain the OAuth 2.0 access token from the NRF, the consumer NF sends an access token request to the NRF. The NRF validates the request, generates an access token, and returns the access token to the consumer NF. When the consumer NF seeks to access the service, the consumer NF sends an SBI service request message to the producer NF. The SBI service request message includes the access token obtained from the NRF. The producer NF verifies the integrity of the claims in the access token and, if the claims are valid, the producer NF provides access to the requested service.

One problem with this architecture is that the access token can be stolen and used by hackers to obtain services from producer NFs without authorization and/or to implement denial of service attacks. Even though an access token has an expiration time, because the access token can be re-used, a hacker who obtains the access token can use the access token maliciously to access SBI services and/or perform a denial of service attack (e.g., by sending a large number of service requests with high priorities to one or more producer NF(s)) before the expiration time.

SUMMARY

Methods, systems, and computer readable media for mitigating effects of access token misuse are disclosed. One example method for mitigating effects of access token misuse comprises: at a network function (NF) comprising at least one processor: receiving, from a sender, a service request comprising an access token, wherein the access token includes an access token identifier and usage attributes indicating a message rate limit and/or a message count limit; determining, using the usage attributes associated with the access token, that the service request should be rejected; and rejecting the service request.

One example system for mitigating effects of access token misuse includes at least one processor, a memory, and an NF using the at least one processor and the memory. The NF configured for: receiving, from a sender, a service request comprising an access token, wherein the access token includes an access token identifier and usage attributes indicating a message rate limit and/or a message count limit; determining, using the usage attributes associated with the access token, that the service request should be rejected; and rejecting the service request.

One example non-transitory computer readable medium comprising computer executable instructions embodied in the non-transitory computer readable medium that when executed by at least one processor of an NF cause the NF to perform steps comprising: receiving a service request comprising an access token, wherein the access token includes an access token identifier and usage attributes indicating a message rate limit and/or a message count limit; determining, using the usage attributes associated with the access token, that the service request should be rejected; and rejecting the service request.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 5 depicts example configuration data usable for determining appropriate usage attributes of access tokens;

DETAILED DESCRIPTION

Figure 1:
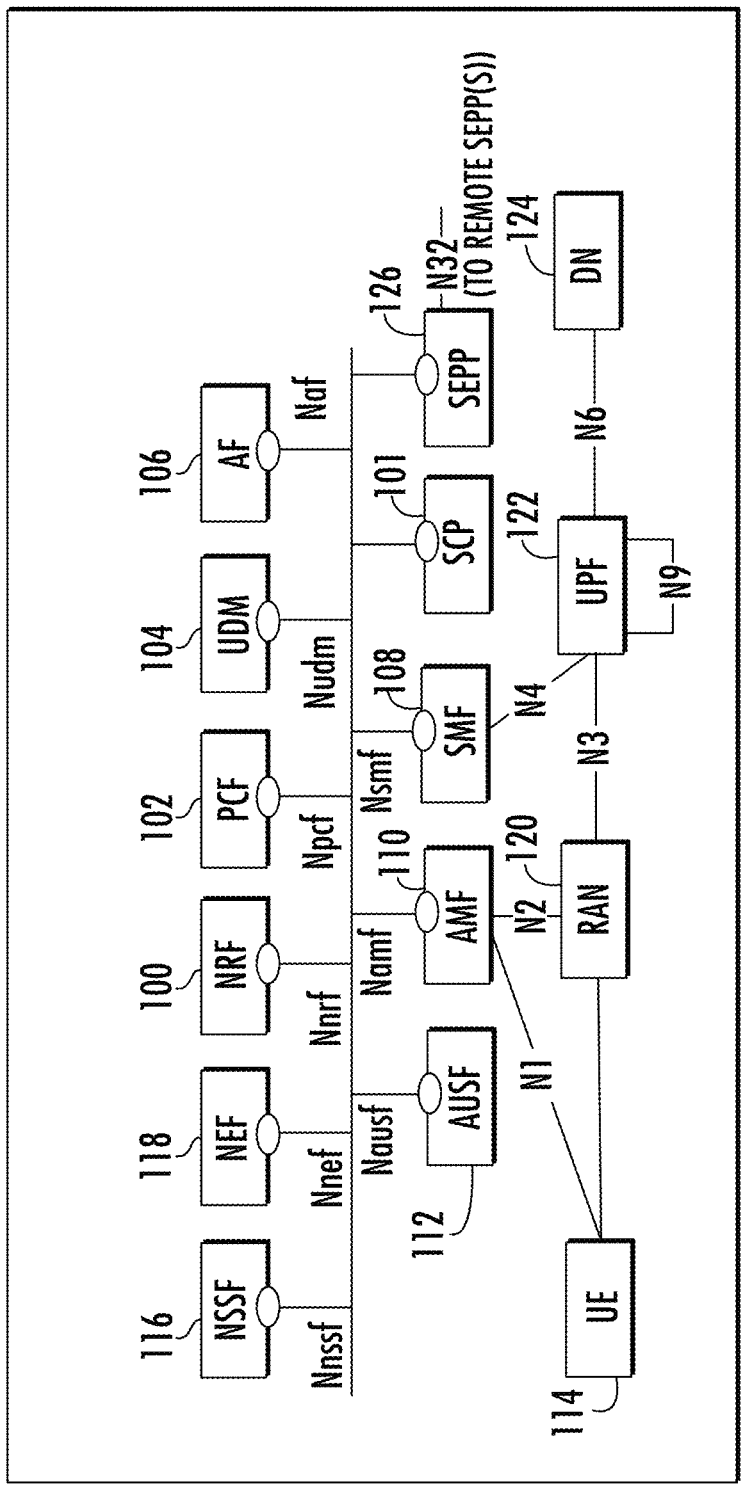
FIG. 1 is a network diagram illustrating an example fifth generation (5G) network architecture.

The subject matter described herein relates to methods, systems, and computer readable media for mitigating effects of access token misuse. As stated above, one problem with 5G service-based interface (SBI) architecture is that an access token can be stolen and used by hackers or malicious entities to obtain services from producer NFs without authorization and/or to implement denial of service attacks. Even though an access token has an expiration time, because the access token can be re-used, a hacker who obtains the access token can use the access token maliciously to access SBI services and/or to perform a denial of service attack (e.g., by sending a large number of service requests with high priorities to one or more producer NF(s)) before the access token expires.

In accordance with some aspects of the subject matter described herein, methods, systems, mechanisms, and/or techniques for generating access tokens with usage attributes are provide. For example, an NF and/or a module in accordance with various aspects described herein may be configured for determining appropriate usage attributes (e.g., claims) of an access token, e.g., when generating an access token (e.g., an OAuth 2.0 access token) in response to receiving a token request message (e.g., an Nnrf_Access-Token_Get request message). In this example, the NF and/or module may utilize a data store mapping various token request information (e.g., target NF type, consumer NF type, or other information) and appropriate usage attributes (e.g., a message rate limit and/or a message count limit) for determining the appropriate usage attributes.

In accordance with some aspects of the subject matter described herein, methods, systems, mechanisms, and/or techniques for maintaining or tracking one or more access token usage metrics associated with various access tokens are provided. For example, when a service request comprising an access token is received, an NF and/or a module in accordance with various aspects described herein may be configured for updating a message rate value associated with the access token and/or updating a message count value associated with the access token.

In accordance with some aspects of the subject matter described herein, methods, systems, mechanisms, and/or techniques for mitigating effects of access token misuse are provided. For example, an NF and/or a module in accordance with various aspects described herein may be configured for: receiving, from a sender, a service request comprising an access token, wherein the access token includes usage attributes indicating a message rate limit and/or a message count limit; determining, using the usage attributes associated with the access token, that the service request should be rejected; and rejecting the service request.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a block diagram illustrating an example 5G system network architecture, e.g., a home 5G core (5GC) network. The architecture in FIG. 1 includes a network function (NF) repository function (NRF) 100 and a service communications proxy (SCP) 101, which may be located in the same home public land mobile network (PLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in 3GPP TS 29.510. The NF or service profile definition includes at least one of an FQDN, an IP version 4 (IPv4) address, or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user devices, such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs 126 usable for forwarding various communications (e.g., 5GC requests) between a consumer NF and a producer NF after applying application level security protection.

As stated above, one problem with security in 5G and subsequent generation networks is that 3GPP TS 33.501 suggests the use of the OAuth 2.0 framework for authorization, and an OAuth 2.0 access token issued by the NRF can be used multiple times before expiration. Because the access token can be used multiple times, it can be misused by a hacker if stolen. 3GPP TS 33.501 does not provide effective mitigation against stolen OAuth 2.0 access token attacks or related misuse.

It will be appreciated that FIG. 1 is for illustrative purposes and that various nodes and/or modules, locations, and/or functionality described above in relation to FIG. 1 may be changed, altered, added, or removed.

Figure 2:
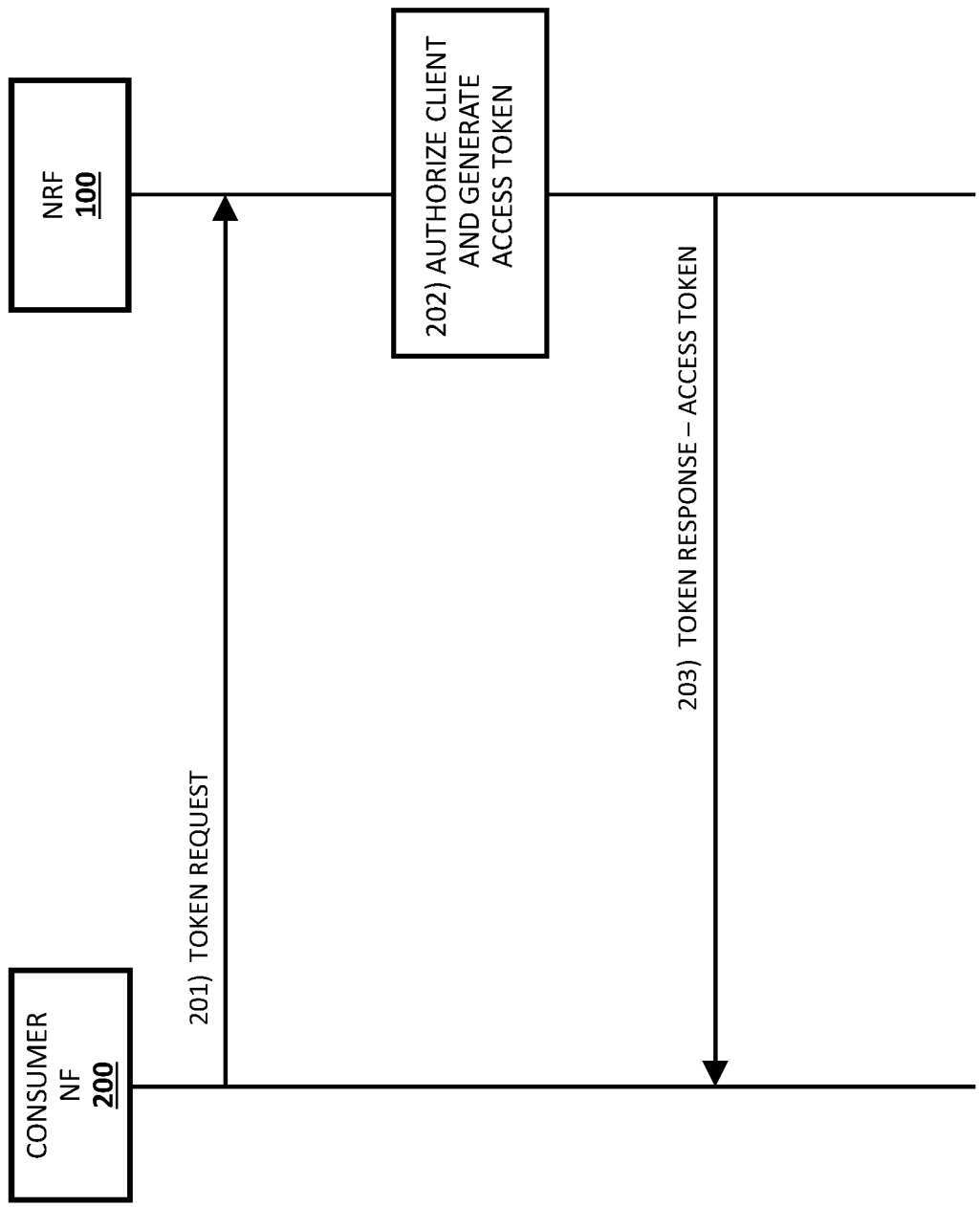
FIG. 2 is a message flow diagram illustrating obtaining an access token from a network function (NF) repository function (NRF)

FIG. 2 is a message flow diagram illustrating obtaining an access token from NRF 100. For example, FIG. 2 depicts aspects of an example service access token authorization process, e.g., as defined in Section 13.4 of 3GPP TS 33.501.

Referring to FIG. 2, in step 201, a consumer NF 200 (also referred to herein as an NF service consumer) may send a token request message (e.g., an Nnrf_AccessToken_Get request message) for requesting an access token (e.g., an OAuth 2.0 access token) to NRF 100 (e.g., acting as an OAuth 2.0 authorization server). The token request message may include expected service names, a producer NF type, a consumer NF type, a client ID, and/or other parameters.

In step 202, NRF 100 may authorize consumer NF 200 (e.g., using client ID and/or other parameters) and may generate an access token (e.g., an OAuth 2.0 access token).

In line 203, NRF 100 may send the access token to NF service consumer 200 in a token response message (e.g., an Nnrf_AccessToken_Get response). The access token may include an expiration time and/or other attributes or claims. However, the access token can still be stolen and reused prior to the expiration time.

It will be appreciated that FIG. 2 is for illustrative purposes and that different and/or additional actions may be performed. It will also be appreciated that various actions described herein may occur in a different order or sequence.

Figure 3:
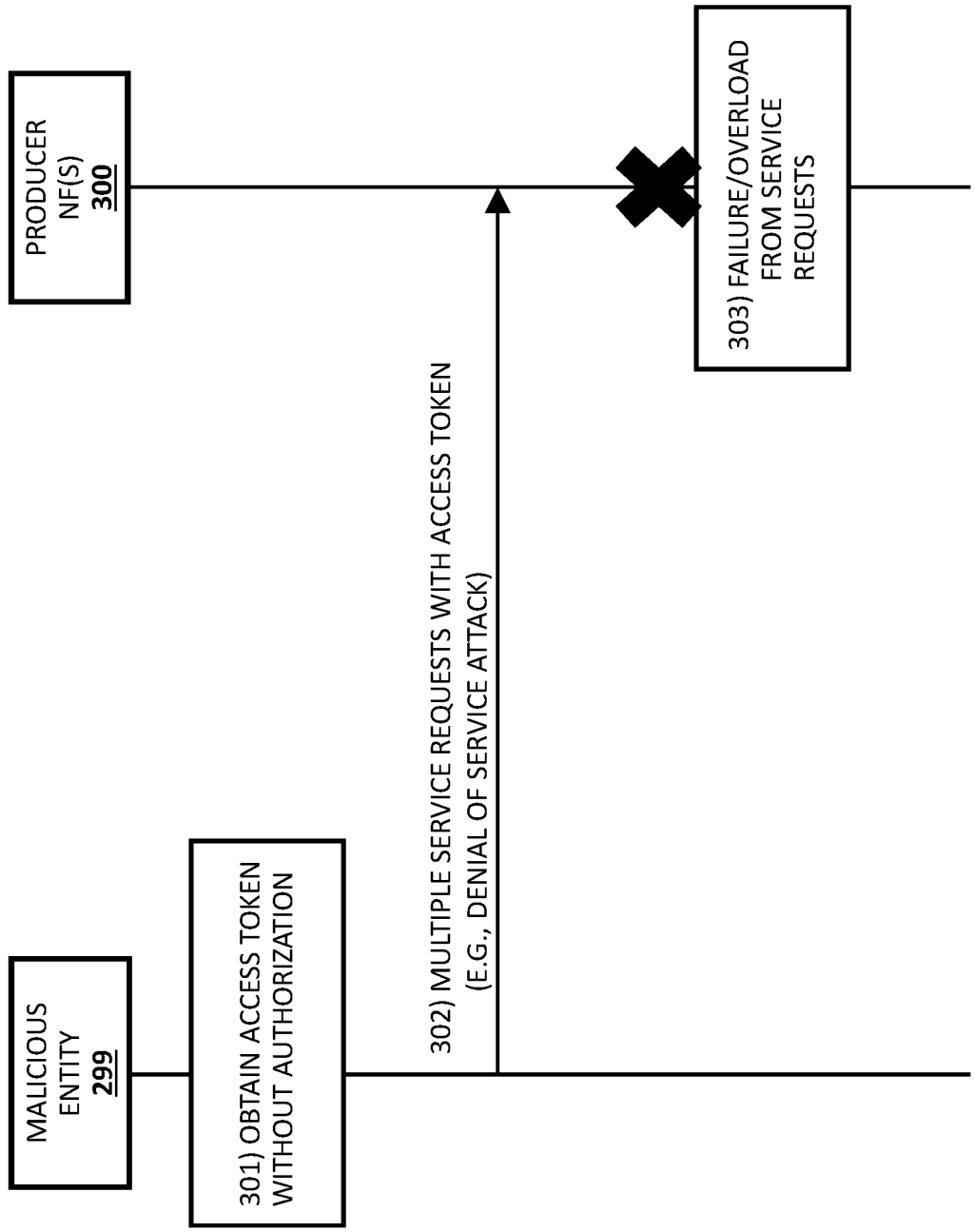
FIG. 3 is a message flow diagram illustrating an example denial of service (DoS) attack involving an access token.

FIG. 3 is a message flow diagram illustrating an example denial of service (DoS) attack involving an access token. As depicted in FIG. 3, a malicious entity 299 may perform or initiate a DDoS attack on producer NF(s) 300. For example, malicious entity 299 may represent an entity that has stolen or otherwise obtain an access token without authorization (e.g., by exploiting a network security issue or an application vulnerability) and/or attempts to use an access token to cause one or more issues, e.g., DoS attacks on producer NF(s) 300.

In some embodiments, malicious entity 299 may represent, include, or utilize one or more NF(s), node(s), or endpoint(s) for interacting with various NFs, e.g., producer NF(s) 300. For example, malicious entity 299 may attempt to perform a distributed DoS (DDoS) attack against producer NF(s) 300 by sending a large number of service requests (each service request with high SBI_message_priority values and a stolen access token) from multiple endpoints and, as such, may attempt to overload producer NF(s) 300 to cause DoS or service issues for various consumer NFs 200.

Referring to FIG. 3, in step 301, malicious entity 299 may obtain an access token without authorization. For example, malicious entity 299 may obtain the access token obtained by consumer NF 200 in FIG. 2 by exploiting a network security issue or an application vulnerability.

In step 302, malicious entity 299 may send a large number of NF service requests (e.g., at a high rate) to a producer NF(s) 300. For example, each NF service request may include an access token originally obtained from NRF 100 by consumer NF 200. In some embodiments, if the scope of the access token allows usage at multiple or different producer NFs 300 (e.g., an NF set), malicious entity 299 may send the service requests to multiple or different producer NFs 300 in an attempt to overload these producer NFs 300 and cause service issues for various consumer NFs 200.

In some embodiments, for each service request, producer NF(s) 300 may receive the service request and validate or verify a related access token thereof. For example, producer NF(s) 300 may verify or validate the integrity and attributes (e.g., claims) of the access token and, if verification or validation is successful, may execute or provide the requested service.

In some embodiments, producer NF(s) 300 may validate an access token (e.g., an OAuth 2.0 access token) by ensuring the integrity of the access token by verifying the access token's signature using the public key of NRF 100, by verifying that the audience claim of the access token matches its own identity, by verifying scope and "additional scope" information of the access token, and by verifying that the access token has not expired (e.g., by checking an expiration time attribute of the access token).

In step 303, producer NF(s) 300 may experience a failure or overload in response to the onslaught of high priority service requests from malicious entity 299. For example, if producer NF(s) 300 is configured for handling high-priority service requests first (e.g., regardless of receipt time) and if malicious entity 299 sends a significantly large amount of such service requests, then producer NF(s) 300 may be incapable of providing services to other consumer NFs 200, thereby malicious entity 299 has effectively cause other consumer NFs 200 to be denied service from producer NF(s) 300.

Thus, FIG. 3 illustrates that as long as the access token has valid claims, malicious entity 299 (e.g., a hacker) can access a service provided by producer NF(s) 300 with a stolen access token and/or cause various related issues. It should be noted that the access token in FIG. 3 can used with multiple different SBI request messages and is not specific to an SBI request message or message type.

Table 1 shown below illustrates attributes, which are also referred to as claims, that are included in an OAuth 2.0 access token. The complete claims data structure for the OAuth 2.0 access token is defined in Table 6.3.5.2.4-1 of 3GPP TS 29.510.

TABLE 1

OAuth 2.0 Access Token Claims

| Attribute Name | Description |
| --- | --- |
| iss | Issuer NRF NF Instance Id |
| sub | Consumer NF Instance Id |
| aud | Producer(s) details |
| scope | Producer Service Names, resource/operation-level scopes |
| exp | Expiration Time |
| consumerPlmnId | Consumer PlmnId |
| producerPlmnId | Producer PlmnId |
| producerSnssailist | Array(Snssai) |
| producerNsiList | Array(string) |
| producerNFSetId | ProducerNfSetId |

As shown in Table 1, an OAuth 2.0 access token may include various claims that identify an issuing NRF, a producer NF, an expiration time, a consumer PLMN, a producer PLMN, producer network slice identifying information, and producer NF set identifying information. However, there is no claim in the defined format for the OAuth 2.0 access token that prevents a hacker from stealing the access token and using the access token to gain unauthorized access to a service provided by a producer NF or otherwise misusing the access token.

The following is an example of access token claims that may be carried in encoded text format in an OAuth 2.0 access token for AMF 110:

```
{
    "iss": "6faf1bbc-6e4a-4454-a507-a14ef8e1bc5c",
    "sub": "6faf1bbc-6e4a-4454-a507-a14ef8e1dc5d",
    "aud": [
    "6faf1bbc-6e4a-4454-a507-b14ef8e1bc4c"
    ],
    "scope" : "namf-mt",
    "exp": 1586169019
}
```

In the illustrated example above, the access token claims include an issuer NF instance ID, a consumer NF instance ID, producer NF details, a scope of the token, and an expiration time. However, as indicated above, a hacker can copy the OAuth 2.0 access token claims and use the access token to access a service provided by producer NF(s) 300 and/or to initiate a denial of service attack on producer NF(s) 300.

As stated above 3GPP TS 33.501 suggests using the OAuth 2.0 access token for authorization for SBI communications. A hacker having access to a stolen OAuth 2.0 access token can use the stolen access token to invoke SBI messages in the network. The existing expiration time field in the OAuth 2.0 access token does not protect against a stolen token attack. The expiration field can mitigate an attack's effectiveness, e.g., by limiting the time period during which an attack can occur. However, reducing the expiration time does not guarantee that misuse cannot occur. Moreover, if the expiration time is set too short, control traffic flows between consumer NFs 200 and NRF 100 may increase significantly (e.g., to obtain new non-expired access tokens), thereby causing delays or related issues, e.g., increased processing time for other messages. Further, while some NFs may utilize local global rate limiting policy to throttle or discard ingress messages in an effort to reduce a global ingress message rate, such a procedure is generally indiscriminate with regard to which network's messages are throttled or discarded Hence, there is a need to mitigate effects of access token misuse. It should also be noted that not all SBI APIs are equal in terms of security and performance. Some APIs need to be highly secure (e.g., NFUpdate and NFDeregister APIs); whereas for other APIs, network operators may choose performance over security since there may be a tradeoff between security and performance.

It will be appreciated that FIG. 3 is for illustrative purposes and that different and/or additional actions may be performed. It will also be appreciated that various actions described herein may occur in a different order or sequence.

Figure 4:
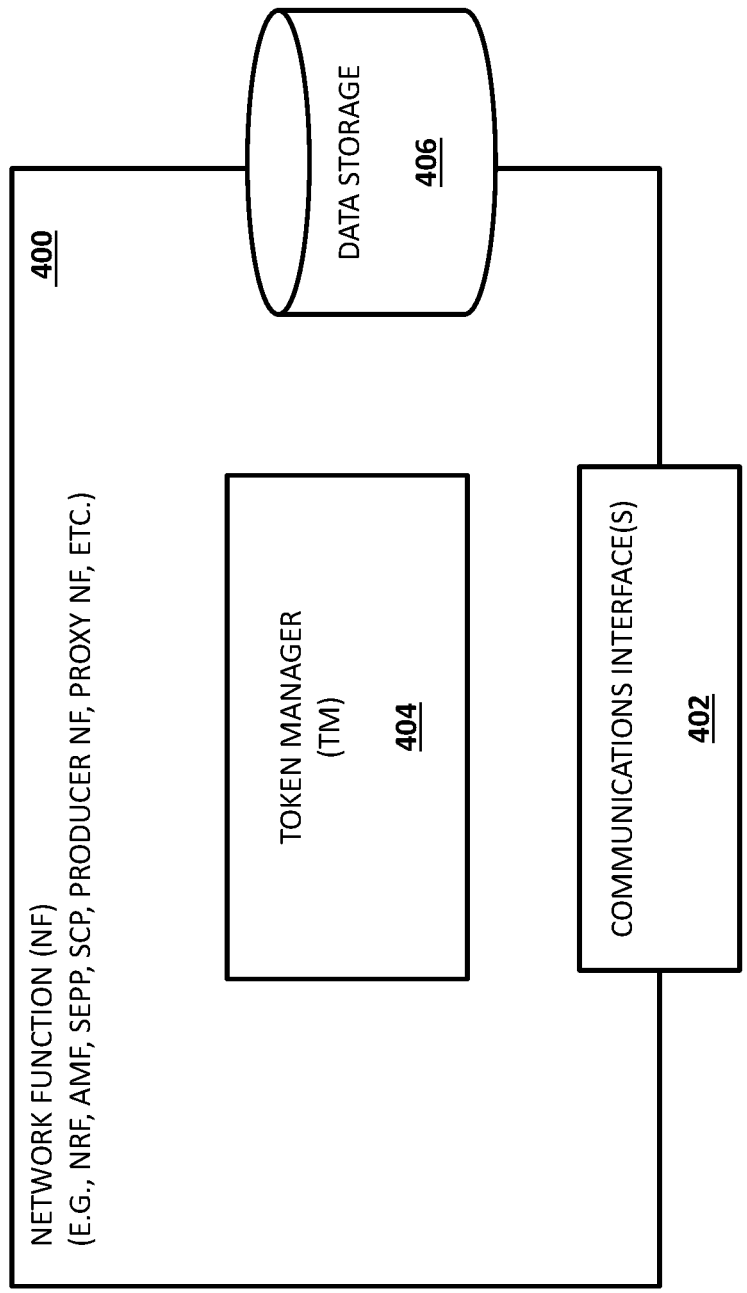
FIG. 4 is a block diagram illustrating an example NF for mitigating effects of access token misuse.

FIG. 4 is a diagram illustrating an example NF 400 for mitigating effects of access token misuse. NF 400 may represent any suitable entity or entities (e.g., one or more node(s), device(s), or computing platform(s)) for performing various aspects associated with using access tokens with usage attributes (e.g., a message rate limit and/or a message count limit) to mitigate unauthorized use (e.g., misuse).

In some embodiments, NF 400 may represent or include an authorization server, a data repository, a network gateway, a network proxy, an edge security device, or other functionality. In some embodiments, NF 400 may represent or include one or more 5GC NFs. For example, NF 400 may represent or include NRF 100, SEPP 126, SCP 101, producer NF(s) 300, AF 106, AMF 110, SMF 108, NEF 118, PCF 102, etc.

Referring to FIG. 4, NF 400 may include one or more communications interface(s) 402 for communicating messages via a communications environment, e.g., one or more 5G or 5GC networks. For example, communications interface(s) 402 may include one or more communication interfaces for communicating with various entities in a home network (e.g., home public land mobile network (H-PLMN)) or a visited network (e.g., a visited public land mobile network (V-PLMN)).

NF 400 may include TM 404. TM 404 may be any suitable entity (e.g., software executing on at least one processor) for performing one or more aspects associated with generating access tokens with usage attributes. In some embodiments, TM 404 or another entity may be configured (e.g., via programming logic) to determine appropriate usage attributes of an access token, e.g., when generating an access token (e.g., an OAuth 2.0 access token) in response to receiving a token request message (e.g., an Nnrf_Access-Token_Get request message).

In some embodiments, access tokens generated or used by NF 400 or TM 404 (or other entities) may include JSON web Token (JWT), e.g., as defined in request for comments (RFC) 7519. In such embodiments, each access token may include an access token ID (e.g., a JWT ID or a "jti") for uniquely identifying the access token and may be stored as a claim or attribute of the access token.

In some embodiments, access tokens (e.g., JWTs and/or OAuth 2.0 access tokens) may include or indicate custom or private attributes (e.g., "Private Claim Names" or vendor specific claims) usable for indicating or providing usage attributes. For example, when generating or issuing an access token, NF 400 acting as NRF 100, TM 404, or another entity may add a "jti" claim for indicating an access token ID and a "vendor_tok_rate" claim for indicating a message rate limit, e.g., a maximum rate of service requests per second that can be received or allowed by a given NF (e.g., a producer NF 300). In another example, e.g., in addition to or in lieu of "vendor_tok_rate" claim, when generating or issuing an access token, NF 400 acting as NRF 100, TM 404, or another entity may add a "vendor_tok_cap" claim for indicating a message capacity or message count limit, e.g., a maximum number of service requests that can be received or allowed by a given NF (e.g., producer NF 300).

In some embodiments, TM 404 or another entity may be configured (e.g., via programming logic) to maintain or track access token usage metrics associated with various access tokens received by NF 400. For example, when a service request comprising an access token is received, TM 404 or another entity may identify an access token ID (e.g., a JWT ID from a claim or attribute of the access token) and then identify, using that access token ID, corresponding metrics or values maintained by or at producer NF(s) 300 to update. In this example, TM 404 or another entity may update a message rate associated with the access token and/or a message count associated with the access token.

In some embodiments, TM 404 or another entity may be configured (e.g., via programming logic) to mitigate effects of access token misuse by determining whether to allow (e.g., service) or reject (e.g., not service) received messages (e.g., service requests) associated with a given access token based on one or more usage attributes of the access token and one or more access token usage metrics. For example, NF 400 or a related module may determine whether a current message rate value associated with an access token (and maintained at or by NF 400) exceeds a message rate limit indicated by a usage attribute of the access token. In this example, if the message rate limit is exceeded, NF 400 or a related module may determine that the service request should be rejected and act accordingly.

In some embodiments, e.g., since malicious entity 299 may decode (e.g., a base64 decode operation) or otherwise determine an associated message rate limit for a given access token and then use that knowledge to not exceed that message rate limit when performing a DoS attack, a network operator can configure NF 400 or TM 404 therein to utilize one or more additional usage attributes for mitigating effects of access token misuse. For example, in addition to confirming that a related message rate limit has not exceeded, NF 400 or a related module may also determine whether a current message count value associated with an access token (and maintained at or by NF 400) exceeds a message count limit indicated by a usage attribute of the access token. In this example, if either the message rate limit or the message count limit is exceeded, NF 400 or a related module may determine that the service request should be rejected and act accordingly.

In some embodiments, when rejecting a service request based on one or more usage attributes, NF 400 or TM 404 therein may send one or more failure responses similar to responses for indicating an access token validation failure based on an expiration time ("exp" claim) associated with the access token. In such embodiments, a recipient of such a failure response may stop using or drop the current access token and obtain or attempt to obtain a new or fresh access token, e.g., even that prior access token had not yet expired.

In some embodiments, e.g., where NF 400 includes NRF 100 or related functionality, NF 400 or TM 404 therein may be configured for receiving, from consumer NF 200, a token request message for requesting an access token for accessing one or more services from producer NF(s) 300, obtaining or generating an access token including determining one or more usage attributes for the access token, and sending the access token to consumer NF 200. In some embodiments, NF 400 or TM 404 therein may utilize various logic and configuration information for generating an access token that includes appropriate usage attributes. In this example, NF 400 or a module therein may utilize various logic and configuration information determining or identifying usage attributes of an access token based on information in a token request message and/or network operator settings.

In some embodiments, e.g., where NF 400 includes NRF 100 or related functionality, NF 400 or TM 404 therein may be configured for generating or maintaining observability data indicating which consumer NFs 200 request access tokens sooner then their expected expiration and/or observability data indicating which producer NFs 200 have access tokens requested for them sooner then their expected expiration. In such embodiments, the observability data may be useful for indicating access token misuse or potential compromised access tokens. In some embodiments, observability data generated by NF 400 or TM 404 therein may be used by a network operator and/or another entity (e.g., a network management node, an analytics node, and/or NRF 100) to fine-tune or adjust one or more rules or corresponding usage attributes (e.g., a message count limit and/or a message rate limit).

In some embodiments, e.g., where NF 400 includes producer NF(s) 300, a proxy NF, or related functionality, NF 400 or TM 404 therein may be configured for receiving a service request comprising an access token with usage attributes (e.g., a message rate limit and/or a message count limit), determining, using the usage attributes associated with the access token, that the service request should be rejected, and rejecting the service request. For example, NF 400 or TM 404 therein may keep track or maintain of one or more access token usage metrics (e.g., a message rate and a message count associated with an access token) and may reject or discard the service request (and subsequent service requests) if an access token usage metric exceeds a corresponding usage attribute of the access token.

In some embodiments, e.g., where NF 400 includes producer NF(s) 300, a proxy NF, or related functionality, NF 400 or TM 404 therein may be configured for generating or maintaining observability data or usage information (e.g., a message rate and/or a message count) for various access tokens. In such embodiments, observability data generated by NF 400 or TM 404 therein may be used by a network operator and/or another entity (e.g., a network management node, an analytics node, and/or NRF 100) to fine-tune or adjust one or more rules or corresponding usage attributes (e.g., a message count limit and/or a message rate limit).

In some embodiments, e.g., where NF 400 includes producer NF(s) 300, a proxy NF, or related functionality, NF 400 or TM 404 therein may be configured for cleaning up or deleting unneeded observability data or usage information (e.g., a message rate and/or a message count) associated with various access tokens. In such embodiments, e.g., periodically (e.g., every 5 minutes) or aperiodically (e.g., in response to an access token expiring), NF 400 or TM 404 therein may perform a cleanup procedure that deletes or compresses usage metrics or other related data for expired, invalid, or unneeded access tokens.

NF 400 may access (e.g., read from and/or write information to) data storage 406. Data storage 406 may be any suitable entity (e.g., a computer readable medium or memory) for storing various data. In some embodiments, data storage 406 may include configuration information usable for identifying appropriate usage attributes of access tokens. For example, data store 406 may include data records or entries indicating associations between token request information and one or more usage attributes to be included for a given access token. In this example, these data records or entries may be based on network operator settings and/or based on historical information (e.g., based on observed performance or related usage information, e.g., generated by NF 400 other entities.

In some embodiments, data storage 406 may include logic for performing various aspects of access token authorization and/or other security procedures for mitigating effects of access token misuse. For example, data storage 406 may include logic for NF 400 to check that a received message does not exceed or violate usage attributes (e.g., a message rate limit and/or a message count limit) of a corresponding access token before providing a service or a related response message.

It will be appreciated that FIG. 4 and its related description are for illustrative purposes and that NF 400 may include additional and/or different modules, components, or functionality.

FIG. 5 is a diagram that depicts example configuration data 500 usable for determining appropriate usage attributes of access tokens. Data 500 may include information (e.g., rules or related data) usable for determining or identifying appropriate usage attributes for various access tokens. For example, when consumer NF 200 sends a token request message, NRF 100 or TM 404 therein may use data 500 or related information (e.g., information in a token request message) to identify an appropriate message rate limit (e.g., a vendor token rate (vendor_tok_rate) value) and/or an appropriate message count limit (e.g., a vendor token capacity (vendor_tok_cap) limit) for an access token that is to be generated and sent to consumer NF 200.

In some embodiments, a network operator and/or another entity (e.g., a network management node, an analytics node, and/or NRF 100) may use configuration logic, data 500, and/or related rules for identifying and setting usage attributes (e.g., a vendor_tok_cap and/or a vendor_tok_rate) for access tokens. In some embodiments, data 500 or related information may indicate priority information for determining which rules (or corresponding usage attributes) apply, e.g., when multiple rules (or corresponding usage attributes) may be applicable. For example, some broad (e.g., low priority) rules for determining or selecting usage attributes may be based on an NF type of the NF for which an access token is being requested, while more granular (e.g., higher priority) rules for determining or selecting usage attributes may be based on an NF instance ID, an NF set, an NF service set, or a locality of the NF for which an access token is being requested.

In some embodiments, a network operator and/or another entity (e.g., a network management node, an analytics node, and/or NRF 100) may adjust configuration logic, data 500, and/or related rules for identifying and setting usage attributes based on historical data, e.g., obtained or tracked usage metrics. For example, producer NF(s) 300 (comprising TM 404 or related functionality) and/or NRF 100 (comprising TM 404 or related functionality) may generate observability data (e.g., alerts and/or logs) indicating how many times or how often an access token was requested, received, or used. In this example, the observability data may be used by a network operator and/or another entity (e.g., a network management node, an analytics node, and/or NRF 100) to fine-tune or adjust one or more rules or corresponding usage attributes (e.g., a message count limit and/or a message rate limit).

Referring to FIG. 5, a table representing data 500 comprises columns and/or fields for a priority, an NF type, a subgroup type, a subgroup value, a message count limit, a message rate limit, and/or a comment or description. As depicted in FIG. 5, each row may associate access token related information (e.g., an NF Type, a destination NF set, an NF instance ID, a target locality, or various information obtained from a token request message) and appropriate usage attributes for a corresponding access token.

A "priority" field may store information for indicating a value indicating when or whether a rule or corresponding usage attributes are to be used (e.g., when two or more rules (or usage attributes) could be applicable). Example data in the "priority" field may include a number between 0 and 100, where lower values indicate higher priorities or vice versa. In some embodiments, data in the "priority" field may have a value of '100' indicating a lowest priority and may be usable for determining base or default usage attributes when no other rules or usage attributes are applicable, e.g., as depicted in row 1 of FIG. 5.

An "NF type" field may store information for indicating the type of NF or other NF information associated with a requested access token. Example data in the "NF type" field may indicate a particular type or types of NFs, (e.g., AMF, SMF, NEF, etc.) that the requested access token is usable for requesting services from or may indicate a particular type of NF from which the token request message is received. For example, a "NF type" field value of "SMF" may indicate that a related rule or corresponding usage attributes are applicable if a corresponding access token request is for obtaining an access token for requesting services from SMF 108, e.g., as depicted in row 2 of FIG. 5. In some embodiments, data in the "NF type" field may indicate that an NF type can be any NF type, e.g., "ALL" or "*". In such embodiments, the value "*" or "ALL" may indicate that the applicability of a rule or corresponding usage attributes are not affected by an NF type. For example, as depicted in FIG. 5, the first row indicates default or base values for usage attributes, e.g., when no other rules or usage attributes are applicable.

A "subgroup type" field may store information for indicating a subgroup type or a type of additional information associated with a requested access token. Example data in the "subgroup type" field may indicate one or more particular type(s) of additional information usable for determining or selecting appropriate usage. For example, a "subgroup type" field value of "instance_ID" may indicate that a related rule or corresponding usage attributes are applicable if an NF instance ID in a token request message matches the instance ID indicated in a corresponding "subgroup value" field, e.g., as depicted in row 3 of FIG. 5. In another example, a "subgroup type" field value of "locality" may indicate that a related rule or corresponding usage attributes are applicable if a target locality in a token request message matches the locality information indicated in a corresponding "subgroup value" field, e.g., as depicted in row 4 of FIG. 5. In another example, the value "*" may indicate that the applicability of a rule or corresponding usage attributes are not affected by a subgroup type, e.g., as depicted in row 1 or 2 of FIG. 5.

A "subgroup value" field may store information for indicating a subgroup value or additional information associated with a requested access token. Example data in the "subgroup value" field may indicate one or more particular values or other data usable for determining or selecting appropriate usage. For example, a "subgroup value" field value of "inst1" associated with a "subgroup value" field value of "instance_ID" may indicate a particular NF instance ID that needs to be indicated by a token request message before a related rule or corresponding usage attributes are applicable, e.g., as depicted in row 3 of FIG. 5.

A "message rate limit" field may store information for representing a predetermined allowed message rate usable as an usage attribute of an access token. For example, a "message rate limit" field value may indicate the highest rate (e.g., 500 messages per seconds (MPS)) of service requests (e.g., create, read, update, and delete (CRUD) requests) associated with a given access token, e.g., allowed to be processed or serviced at or by producer NF(s) 300.

A "message count limit" field may store information for representing a predetermined allowed message capacity usable as an usage attribute of an access token. For example, a "message count limit" field may indicate the highest number of service requests (e.g., CRUD requests) associated with a given access token, e.g., allowed to be processed or serviced at or by producer NF(s) 300.

It will also be appreciated that data 500 is for illustrative purposes and that different and/or additional data than the data depicted in FIG. 5 may be usable for determining or identifying appropriate usage attributes for various access tokens. Further, data 500 may be stored (e.g., in data storage 406) or managed using various data structures and/or computer readable media.

Figure 6:
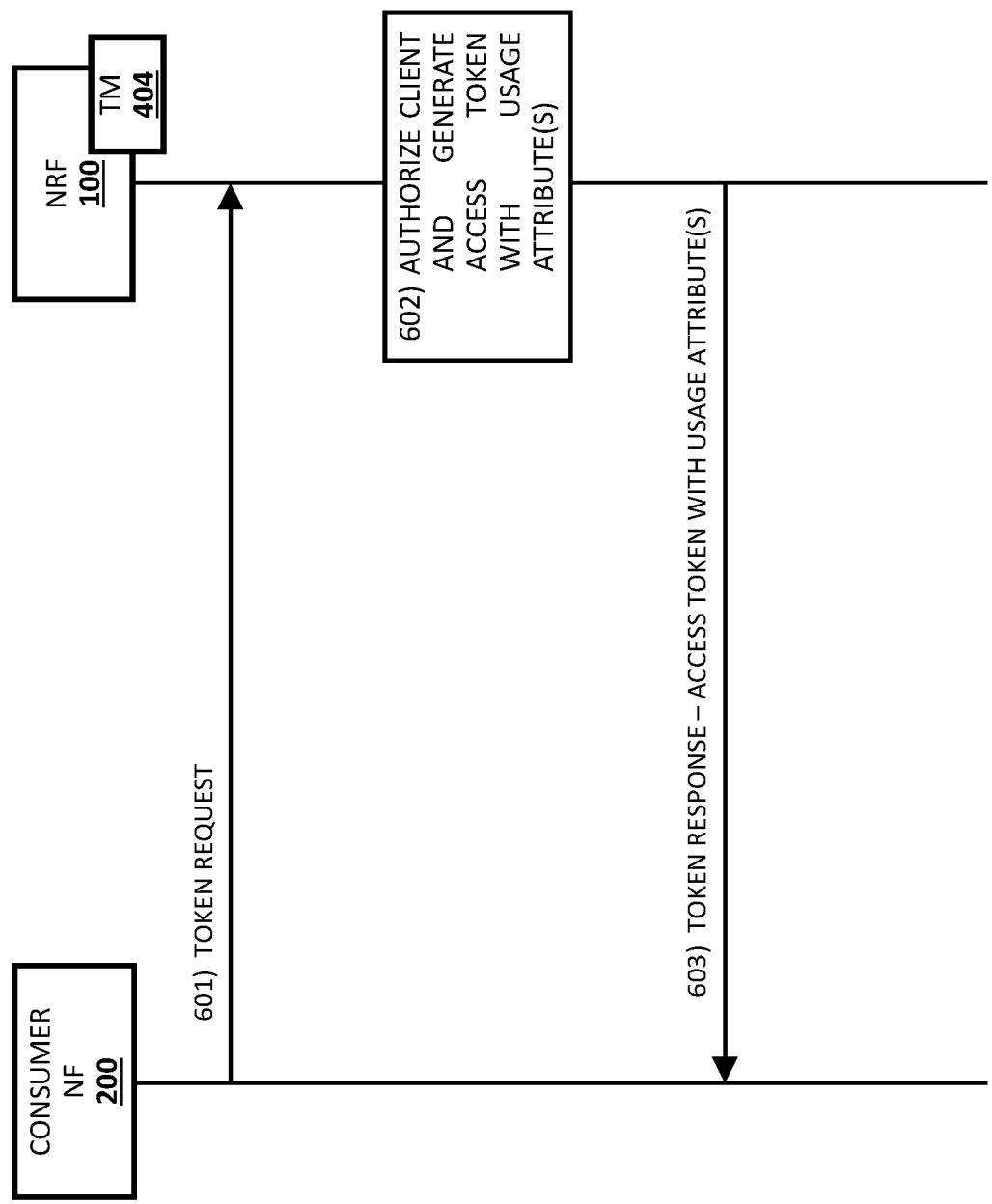
FIG. 6 is a message flow diagram illustrating a consumer NF obtaining an access token with usage attributes from an NRF.

FIG. 6 is a message flow diagram illustrating consumer NF 200 obtaining an access token with usage attributes from NRF 100. For example, FIG. 6 depicts NRF 100 comprising TM 404 performing various aspects associated with generating an access token with usage attributes and providing the access token with the usage attributes.

Referring to FIG. 6, in step 601, consumer NF 200 may send a token request message (e.g., an Nnrf_AccessToken_Get request message) for requesting an access token (e.g., an OAuth 2.0 access token) to NRF 100 (e.g., acting as an OAuth 2.0 authorization server). The Nnrf_AccessToken_Get request message may include expected service names, a producer NF type, a consumer NF type, a client ID, and other parameters.

In step 602, NRF 100 may authorize consumer NF 200 (e.g., using client ID and/or other parameters) and may generate an access token (e.g., an OAuth 2.0 access token) with an access token identifier (ID) (e.g., a JWT ID) and various usage attributes (e.g., a message rate limit and/or a message count limit). In some embodiments, NRF 100 and/or a module therein (e.g., TM 404) may generate usage attributes or claims associated with the access tokens. For example, NRF 100 and/or a module therein (e.g., TM 404) may utilize usage attributes 500 to identify appropriate usage attributes for an access token associated with a particular access token request and then provide the access token along with those usage attributes.

In line 603, NRF 100 may send the access token with the usage attributes to consumer NF 200 in a token response message (e.g., an Nnrf_AccessToken_Get response). The access token may include an access token ID (e.g., a JWT ID) and a message rate limit, a message count limit, an expiration time, and/or other attributes or claims.

In some embodiments, while an access token with usage attributes may be stolen, the usage attributes may be usable by various NFs (e.g., NF 400) to prevent or mitigate consumer NF 200 or other entities (e.g., malicious entity 299) from performing various attacks or other misuses.

For example, NF 400 and/or TM 404 therein may keep track of a message rate associated with an access token and, when a new service request associated with the access token is received, a computed current message rate associated with the access token may be compared to a message rate limit indicated by a claim of the access token. In this example, NF 400 and/or TM 404 therein may reject or discard the service request (and subsequent service requests) if the current message rate exceeds the message rate limit.

In another example, NF 400 and/or TM 404 therein may use a counter or other mechanism to keep track of a total number of service requests associated with an access token received by NF 400 and, when a new service request associated with the access token is received, a current message count associated with the access token may be compared to a message count limit indicated by a claim of the access token. In this example, NF 400 and/or TM 404 therein may reject or discard the service request (and subsequent service requests) if the current message count exceeds the message count limit.

It will be appreciated that FIG. 6 is for illustrative purposes and that different and/or additional actions may be performed. It will also be appreciated that various actions described herein relating to FIG. 6 may occur in a different order or sequence.

Figure 7:
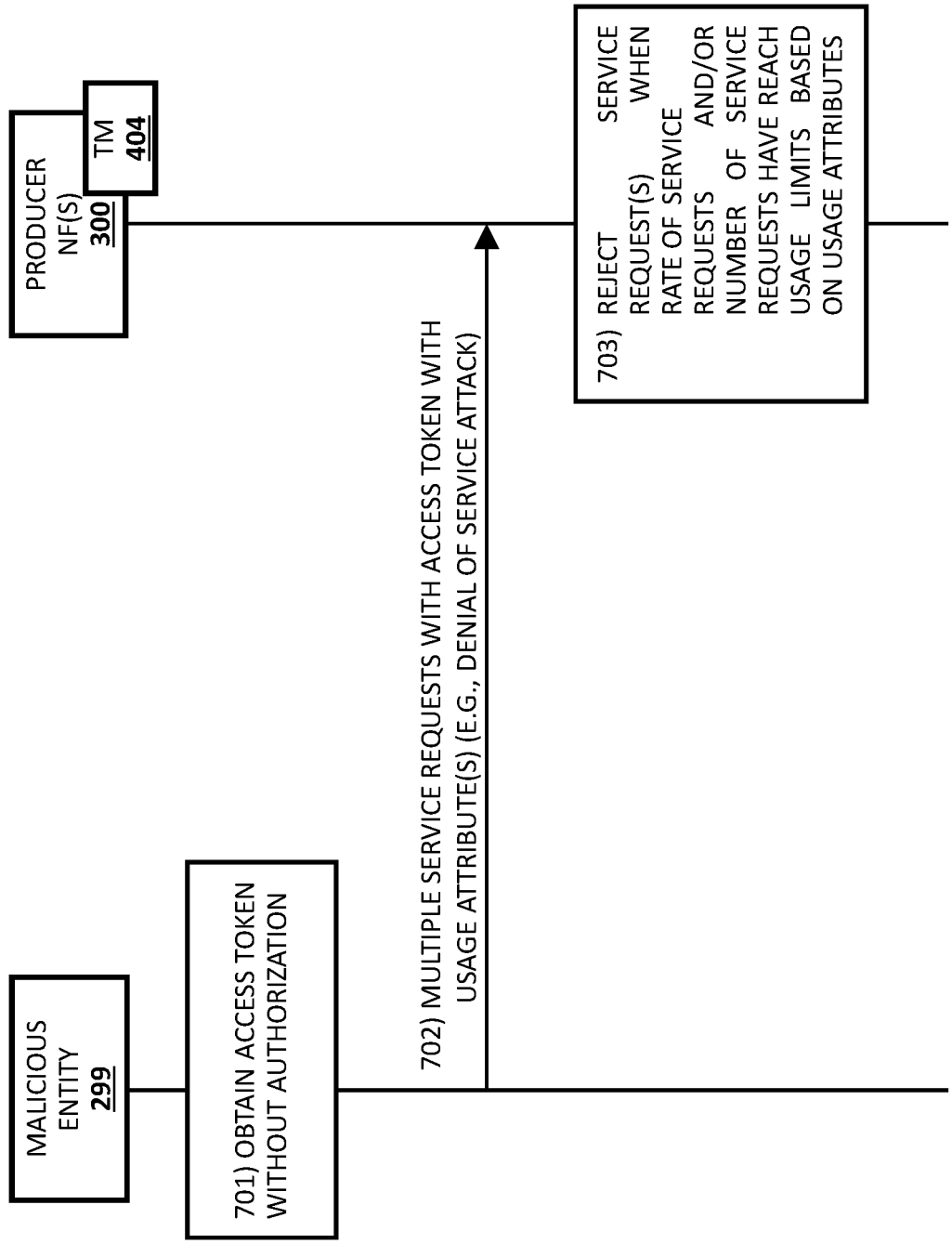
FIG. 7 is a message flow diagram illustrating one or more producer NF(s) using usage attributes of an access token to mitigate a DoS attack.

FIG. 7 is a message flow diagram illustrating producer NF(s) 300 using usage attributes of an access token to mitigate a DoS attack. In some embodiments, proxy NF 800 may represent SCP 101 and/or SEPP 126 and may act as a proxy for receiving and providing service requests to producer NF(s) 300. For example, producer NF(s) 300 may be configured to accept or allow SBI related (e.g., HTTP2) connections (or related service requests) based on an allow list indicating authorized NFs. In this example, proxy NF 800 may be on the allow list as an authorized NF. Continuing with this example, non-authorized NFs, such as malicious entity 299 or entities not on the allow list, may be unable to setup a direct connection with producer NF(s) 300, but may utilize or attempt to utilize proxy NF 800 to request services from producer NF(s) 300.

In some embodiments, e.g., as depicted in FIG. 7, producer NF(s) 300 may include TM 404 or related functionality for using usage attributes of access tokens to guard against or to mitigate effects of access token misuse. For example, by utilizing TM 404 or related functionality at producer NF(s) 300, producer NF(s) 300 may keep track of a message rate (e.g., requests per second or minute) at which producer NF(s) 300 receives service requests associated with a given access token (e.g., identifiable by a JWT ID in the access token) and may reject service requests associated with that access token if or when that message rate exceeds a related usage attribute of the access token (e.g., a message rate limit). In another example, e.g., in lieu of or in addition to checking a message rate, producer NF(s) 300 may keep track of a number of received service requests (e.g., a message count) associated with a given access token (e.g., identifiable by a JWT ID in the access token) and may reject service requests associated with that access token if or when that message count exceeds a related usage attribute of the access token (e.g., a message count limit or a message capacity).

Referring to FIG. 7, in step 701, malicious entity 299 may obtain an access token without authorization. For example, malicious entity 299 may obtain the access token obtained by consumer NF 200 in FIG. 2 by exploiting a network security issue or an application vulnerability.

In step 702, malicious entity 299 may send a large number of NF service requests (e.g., at a high rate) to producer NF(s) 300. For example, each NF service request may include an access token originally obtained from NRF 100 by consumer NF 200. In some embodiments, if the scope of the access token allows usage at different or multiple producer NFs 300, malicious entity 299 may send the service requests to multiple or different producer NFs 300 in an attempt to overload these producer NFs 300 and cause service issues for various consumer NFs 200.

In some embodiments, for each service request, producer NF(s) 300 may receive the service request and validate or verify a related access token thereof, e.g., before sending or forwarding the service request onward to producer NF(s) 300. For example, producer NF(s) 300 may verify or validate the integrity and attributes (e.g., claims) of an access token associated with a service request and, if verification or validation is successful, may then execute or perform the service request, e.g., provide the requested service.

In some embodiments, producer NF(s) 300 may validate an access token (e.g., an OAuth 2.0 access token) by ensuring the integrity of the access token by verifying the access token's signature using the public key of NRF 100, by verifying that the audience claim of the access token matches its own identity, by verifying scope and "additional scope" information of the access token, and by verifying that the access token has not expired (e.g., by checking an expiration time attribute of the access token).

In some embodiments, producer NF(s) 300, TM 404, or another entity may be configured (e.g., via programming logic) to maintain or track access token usage metrics associated with various access tokens received by producer NF(s) 300. For example, when a service request comprising an access token is received, producer NF(s) 300, TM 404, or another entity may identify an access token ID (e.g., a JWT ID from a claim or attribute of the access token) and then identify, using that access token ID, corresponding metrics or values maintained by or at producer NF(s) 300 to update. In this example, producer NF(s) 300, TM 404, or another entity may update a message rate associated with the access token and/or a message count associated with the access token.

In some embodiments, producer NF(s) 300, TM 404, or another entity may be configured (e.g., via programming logic) to mitigate effects of access token misuse by determining whether to allow (e.g., service) or reject (e.g., not service) received messages (e.g., service requests) associated with a given access token based on usage attributes of the access token and access token usage metrics maintained at or by producer NF(s) 300. For example, before processing or servicing a service request comprising an access token with one or more usage attributes, producer NF(s) 300, TM 404, or another entity may determine whether a current message rate value associated with the access token (and maintained at or by producer NF(s) 300) exceeds a message rate limit indicated by a usage attribute of the access token and/or determine whether a current message count value associated with an access token (and maintained at or by producer NF(s) 300) exceeds a message count limit indicated by a usage attribute of the access token. In this example, if either limit is exceeded, producer NF(s) 300, TM 404, or another entity may determine that the service request should be rejected and act accordingly (e.g., not service or process the service request).

In step 703, producer NF(s) 300 may reject one or more service request(s) when a message rate (e.g., a recently computed message rate) associated with service requests comprising the same access token (received at or by producer NF(s) 300) reaches or exceeds a message rate limit indicated by a usage attribute of the access token or when a message count (e.g., a recently computed message count) associated with service requests comprising the same access token (received at or by producer NF(s) 300) reaches or exceeds a message count limit indicated by a usage attribute of the access token.

It will be appreciated that FIG. 7 is for illustrative purposes and that different and/or additional actions may be performed. It will also be appreciated that various actions described herein relating to FIG. 7 may occur in a different order or sequence.

Figure 8:
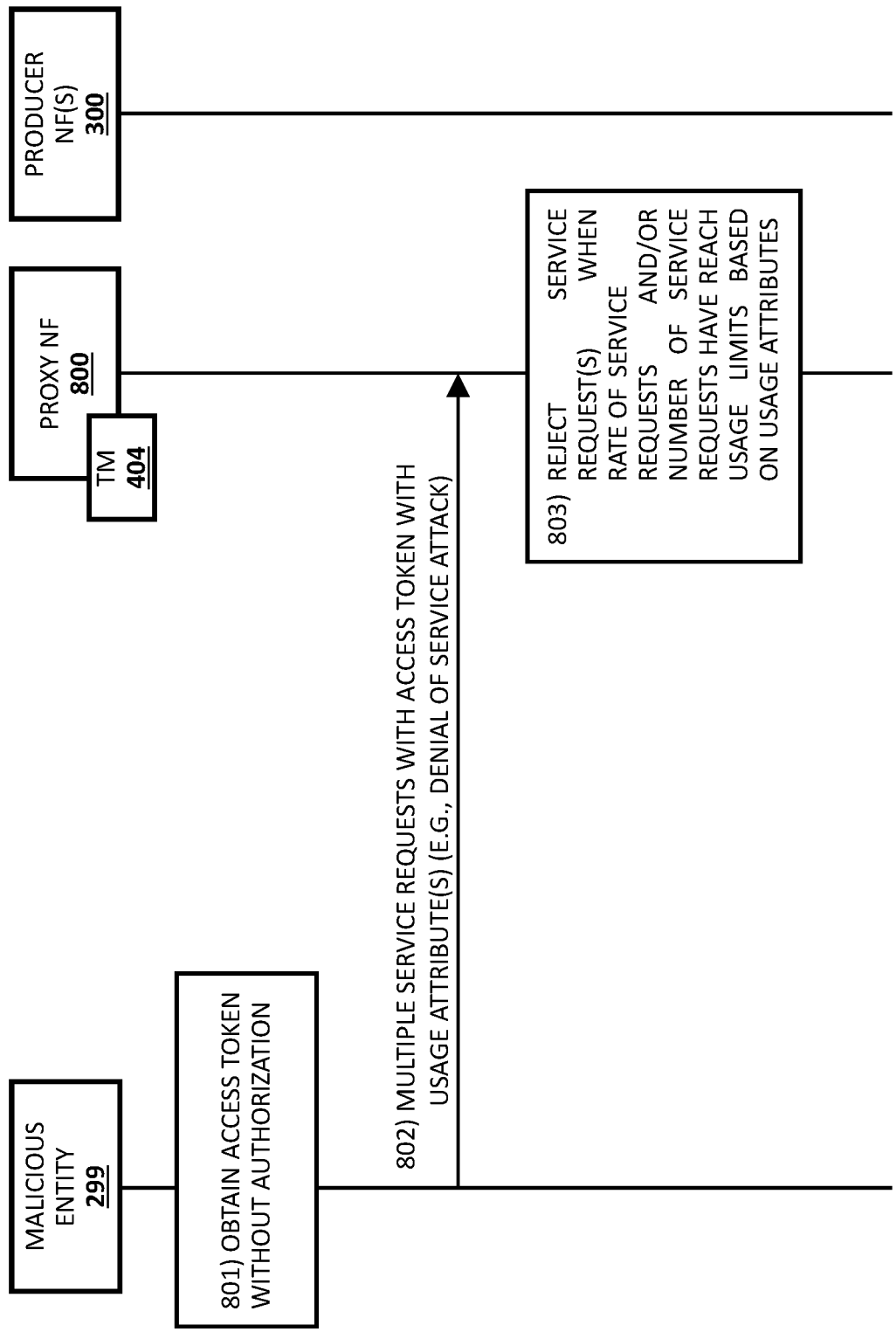
FIG. 8 is a message flow diagram illustrating a proxy NF using usage attributes of an access token to mitigate a DoS attack.

FIG. 8 is a message flow diagram illustrating a proxy NF 800 using usage attributes of an access token to mitigate a DoS attack. In some embodiments, proxy NF 800 may represent SCP 101 and/or SEPP 126 and may act as a proxy for receiving and providing service requests to producer NF(s) 300. For example, producer NF(s) 300 may be configured to accept or allow SBI related (e.g., HTTP2) connections (or related service requests) based on an allow list indicating authorized NFs. In this example, proxy NF 800 may be on the allow list as an authorized NF. Continuing with this example, non-authorized NFs, such as malicious entity 299 or entities not on the allow list, may be unable to setup a direct connection with producer NF(s) 300, but may utilize or attempt to utilize proxy NF 800 to request services from producer NF(s) 300.

In some embodiments, e.g., as depicted in FIG. 8, proxy NF 800 may include TM 404 or related functionality for using usage attributes of access tokens to guard against or to mitigate effects of access token misuse. For example, by utilizing TM 404 or related functionality at proxy NF 800, producer NF(s) 300 may be protected from access token misuse, e.g., without requiring TM 404 or related functionality to be implemented on producer NF(s) 300. In another example, by utilizing TM 404 or related functionality at proxy NF 800, if malicious entity 299 tries to perform a DDoS attack at multiple producer NF(s) 300 through the same proxy NF 800 (e.g., SCP 101), then proxy NF 800 can mitigate the effects of the DDoS attack (since related service requests are received by proxy NF 800). In another example, by utilizing TM 404 or related functionality at proxy NF 800 where proxy NF 800 include SEPP 126, proxy NF 800 can mitigate a DDoS attack or other access token misuses in various roaming scenarios.

Referring to FIG. 8, in step 801, malicious entity 299 may obtain an access token without authorization. For example, malicious entity 299 may obtain the access token obtained by consumer NF 200 in FIG. 2 by exploiting a network security issue or an application vulnerability.

In step 802, malicious entity 299 may send a large number of NF service requests (e.g., at a high rate) to proxy NF 800 for producer NF(s) 300. For example, each NF service request may include an access token originally obtained from NRF 100 by consumer NF 200. In some embodiments, if the scope of the access token allows usage at multiple or different producer NFs 300, malicious entity 299 may send the service requests to proxy NF 800 for delivery to multiple or different producer NFs 300 in an attempt to overload these producer NFs 300 and cause service issues for various consumer NFs 200.

In some embodiments, for each service request, proxy NF 800 may receive the service request and validate or verify a related access token thereof, e.g., before sending or forwarding the service request onward to producer NF(s) 300. For example, proxy NF 800 may verify or validate the integrity and attributes (e.g., claims) of an access token associated with a service request and, if verification or validation is successful, may then send the service request associated with the access token to producer NF(s) 300.

In some embodiments, proxy NF 800 may validate an access token (e.g., an OAuth 2.0 access token) by ensuring the integrity of the access token by verifying the access token's signature using the public key of NRF 100, by verifying that the audience claim of the access token matches its own identity, by verifying scope and "additional scope" information of the access token, and by verifying that the access token has not expired (e.g., by checking an expiration time attribute of the access token).

In some embodiments, proxy NF 800, TM 404, or another entity may be configured (e.g., via programming logic) to maintain or track access token usage metrics associated with various access tokens received by proxy NF 800. For example, when a service request comprising an access token is received, proxy NF 800, TM 404, or another entity may identify an access token ID (e.g., a JWT ID from a claim or attribute of the access token) and then identify, using that access token ID, corresponding usage metrics or values maintained by or at proxy NF 800 to update. In this example, proxy NF 800, TM 404, or another entity may update a message rate associated with the access token and/or a message count associated with the access token.

In some embodiments, proxy NF 800, TM 404, or another entity may be configured (e.g., via programming logic) to mitigate effects of access token misuse by determining whether to allow (e.g., service) or reject (e.g., not service) received messages (e.g., service requests) associated with a given access token based on usage attributes of the access token and access token usage metrics maintained at or by proxy NF 800. For example, before sending or forwarding a service request comprising an access token with one or more usage attributes onward to producer NF(s) 300, proxy NF 800, TM 404, or another entity may determine whether a current message rate value associated with the access token (and maintained at or by proxy NF 800) exceeds a message rate limit indicated by a usage attribute of the access token and/or determine whether a current message count value associated with an access token (and maintained at or by proxy NF 800) exceeds a message count limit indicated by a usage attribute of the access token. In this example, if either limit is exceeded, proxy NF 800, TM 404, or another entity may determine that the service request should be rejected and act accordingly (e.g., not forward the service request to producer NF(s) 300).

In step 803, proxy NF 800 may reject (e.g., not forward to producer NF(s) 300) one or more service request(s) when a message rate (e.g., a recently computed message rate) associated with service requests comprising the same access token (received at or by proxy NF 800) reaches or exceeds a message rate limit indicated by a usage attribute of the access token or when a message count (e.g., a recently computed message count) associated with service requests comprising the same access token (received at or by proxy NF 800) reaches or exceeds a message count limit indicated by a usage attribute of the access token. It will be appreciated that FIG. 8 is for illustrative purposes and that different and/or additional actions may be performed. It will also be appreciated that various actions described herein relating to FIG. 8 may occur in a different order or sequence.

Figure 9:
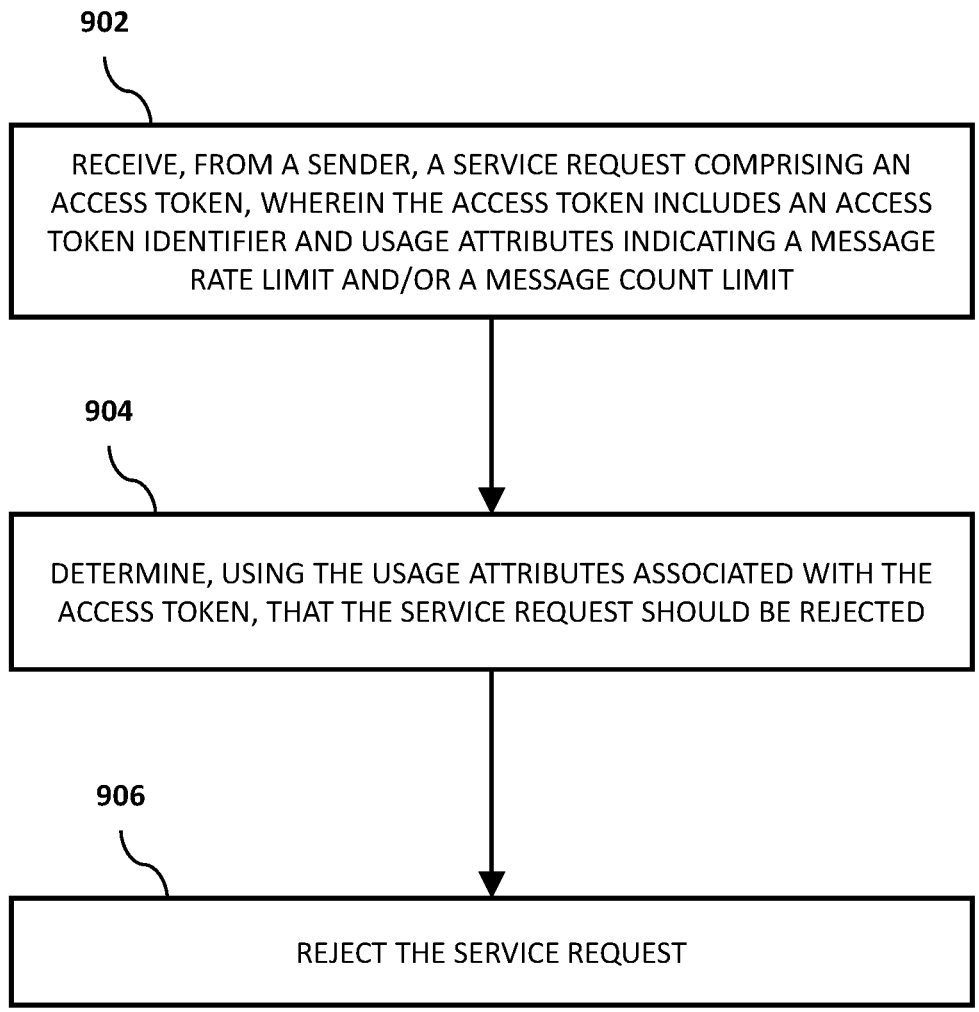
FIG. 9 is a flow chart illustrating an example process for mitigating effects of access token misuse.

FIG. 9 is a diagram illustrating an example process 900 for mitigating effects of access token misuse. In some embodiments, example process 900 described herein, or portions (e.g., operations or steps) thereof, may be performed at or performed by NF 400, TM 404, and/or another module, NF, or node.

Referring to process 900, in step 902, a service request comprising an access token may be received from a sender (e.g., malicious entity 299), wherein the access token includes an access token identifier (e.g., a JWT ID or a "jti" claim) and usage attributes indicating a message rate limit (e.g., a "vendor_tok_rate" claim) and/or a message count limit (e.g., a "vendor_tok_cap" claim).

In some embodiments, an access token may include an OAuth 2.0 access token and at least one of usage attributes may be a claim of the OAuth 2.0 access token.

In step 904, it may be determined, using the usage attributes associated with the access token, that the service request should be rejected. In some embodiments, determining that the service request should be rejected may include determining that a message rate value exceeds a message rate limit associated with an access token or determining that a message count value exceeds a message count limit associated with an access token and, in response, determining that the service request should be rejected.

In some embodiments, an access token ID (e.g., a JWT ID) may be usable for identifying a message rate value and/or a message count value maintained by an NF (e.g., producer NF 300 comprising TM 404 or related functionality).

In step 906, the service request may be rejected. In some embodiments, a service request may be rejected regardless of an expiration period associated with the access token.

In some embodiments, after a service request that includes an access token is received, an NF (e.g., NF 400) may be configured for updating a message rate value of a rate counter for indicating a received rate of service requests associated with the access token.

In some embodiments, after a service request that includes an access token is received, an NF (e.g., NF 400) may be configured for updating a message count value of a message counter for indicating a received number of service requests associated with the access token.

In some embodiments, e.g., prior to an NF receiving a service request comprising an access token, an NRF (e.g., NRF 100) may be configured for receiving, from a consumer NF (e.g., consumer NF 200), an access token request; generating the access token including an access token ID (e.g., a JWT ID) and the usage attributes; and sending the access token to the consumer NF, wherein the consumer NF may be different from the sender of the service request (e.g., malicious entity 299).

In some embodiments, an NF (e.g., NF 400) may include SCP 101, SEPP 126, proxy NF 800, or producer NF(s) 300.

In some embodiments, an NF may be configured for generating usage information indicating usage of the access token; and sending the usage information to another NF (e.g., NRF 100) or a network operator. In such embodiments, the usage attributes of the access token may be adjusted for subsequent access token requests using the usage information.

In some embodiments, an NF (e.g., NF 400) may be configured to delete tracking information (e.g., usage metrics or other usage data) associated with an access token when the access token is no longer valid or active, e.g., when the access token expires.

It will be appreciated that process 900 is for illustrative purposes and that different and/or additional actions may be performed. It will also be appreciated that various actions described herein related to process 900 may occur in a different order or sequence.

It will be appreciated that while some aspects of the subject matter described herein has been discussed with reference to 5G networks various other networks may utilize some aspects of the subject matter described herein. For example, any network that allows or utilizes access tokens with customizable attributes or claims may use features, systems, mechanisms, and/or techniques described herein to indicate usage limits or restrictions for mitigating unauthorize usage of access tokens (e.g., mitigating DDoS attacks from malicious entity 299 using a stolen access token).

It should be noted that NF 400, TM 404, and/or functionality described herein may constitute a special purpose computing device. Further, NF 400, TM 404, and/or functionality described herein can improve the technological field of network communications. For example, NF 400 may include TM 404 and may be capable of rejecting service requests (e.g., CRUD calls) that are associated with an access token when one or more related usage metrics exceed one or more usage attributes of the access token, thereby allowing NF 400 (e.g., producer NF(s) 300, SCP 101, SEPP, 126, etc.) to mitigate various attacks or misuses of access tokens (e.g., stolen by malicious entity 299).

The disclosure of each of the following references is incorporated herein by reference in its entirety to the extent not inconsistent herewith and to the extent that it supplements, explains, provides a background for, or teaches methods, techniques, and/or systems employed herein.

REFERENCES 1. 3GPP TS 33.501; 3rd Generation Partnership Project; Technical Specification Group Services and System Aspects; Security architecture and procedures for 5G system; (Release 16); V16.8.0 (2021-09).
2. 3GPP TS 29.510; 3rd Generation Partnership Project; Technical Specification Group Core Network and Terminals; 5G System; Network Function Repository Services; Stage 3 (Release 16); V16.9.0 (2021-09).
3. Jones, M., Bradley, J., and N. Sakimura, "JSON Web Token (JWT)", IETF RFC 7519, DOI 10.17487/RFC7519, May 2015, <https://www.rfc-editor.org/info/rfc7519>.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for mitigating effects of access token misuse, the method comprising:
   at a network function (NF) comprising at least one processor:
   receiving, from a sender, a service request comprising an access token, wherein the access token includes an access token identifier and usage attributes indicating a message rate limit, wherein the access token comprises an OAuth 2.0 access token and the usage attributes indicating the message rate limit include a claim of the OAuth 2.0 access token specifying a message rate limit or a message count limit;
   after the service request is received, updating a message rate value of a rate counter for indicating a received rate of service requests associated with the access token;
   determining, using the message rate limit or the message count limit specified by the claim of the OAuth 2.0 access token, that the service request should be rejected, wherein determining, using the message rate limit or the message count limit specified by the claim of the OAuth 2.0 access token that the service request should be rejected includes comparing the message rate value and the message rate limit or the message count limit specified by the claim of the OAuth 2.0 access token and determining that the message rate value exceeds the message rate limit or the message count limit specified by the claim of the OAuth 2.0 access token; and
   rejecting the service request.

2. The method of claim 1 comprising:
   at the NF:
   after the service request is received:
   updating a message count value of a message counter for indicating a received number of service requests associated with the access token.

3. The method of claim 2 wherein the claim of the OAuth 2.0 access token specifies the message count limit and determining, using the message rate limit or the message count limit specified by the claim of the OAuth 2.0 access token, that the service request should be rejected includes determining that the message rate value exceeds the message rate limit or determining that the message count value exceeds the message count limit and, in response, determining that the service request should be rejected.

4. The method of claim 2 wherein the access token identifier is usable for identifying the message rate value and/or the message count value maintained by the NF.

5. The method of claim 1 comprising:
   at an NF repository function (NRF) and prior to the NF receiving the service request:
   receiving, from a consumer NF, an access token request;
   generating the access token including the access token identifier and the usage attributes; and
   sending the access token to the consumer NE, wherein the consumer NE is different from the sender of the service request.

6. The method of claim 1 wherein the service request is rejected regardless of an expiration period associated with the access token.

7. The method of claim 1 wherein the NF includes a service communication proxy (SCP), a security edge protection proxy (SEPP), a proxy NF, or a producer NF.

8. The method of claim 1 comprising:
at the NF:
generating usage information indicating usage of the access token; and
sending the usage information to an NF repository function (NRF) or a network operator.

9. A system for mitigating effects of access token misuse, the system comprising:
at least one processor;
a memory; and
a network function (NF) implemented using the at least one processor and the memory, the NF configured for:
receiving, from a sender, a service request comprising an access token, wherein the access token includes an access token identifier and usage attributes indicating a message rate limit, wherein the access token comprises an OAuth 2.0 access token and the usage attributes indicating the message rate limit include a claim of the OAuth 2.0 access token specifying a message rate limit or a message count limit;
after the service request is received, updating a message rate value of a rate counter for indicating a received rate of service requests associated with the access token;
determining, using the message rate limit or the message count limit specified by the claim of the OAuth 2.0 access token, that the service request should be rejected, wherein determining using the message rate limit or the message count limit specified by the claim of the OAuth 2.0 access token that the service request should be rejected includes comparing the message rate value and the message rate limit or the message count limit specified by the claim of the OAuth 2.0 access token and determining that the message rate value exceeds the message rate limit or the message count limit specified by the claim of the OAuth 2.0 access token; and
rejecting the service request.

10. The system of claim 9 wherein the NF is configured for:
after the service request is received:
updating a message count value of a message counter for indicating a received number of service requests associated with the access token.

11. The system of claim 10 wherein the claim of the OAuth 2.0 access token specifies the message count limit and the NF is configured for determining that the message rate value exceeds the message rate limit or determining that the message count value exceeds the message count limit and, in response, determining that the service request should be rejected.

12. The system of claim 10 wherein the access token identifier is usable for identifying the message rate value and/or the message count value maintained by the NE.

13. The system of claim 9 comprising:
an NF repository function (NRF) configured for:
prior to the NF receiving the service request:
receiving, from a consumer NF, an access token request;
generating the access token including the access token identifier and the usage attributes; and
sending the access token to the consumer NF, wherein the consumer NF is different from the sender of the service request.

14. The system of claim 9 wherein the service request is rejected regardless of an expiration period associated with the access token.

15. The system of claim 9 wherein the NF includes a service communication proxy (SCP), a security edge protection proxy (SEPP), a proxy NF, or a producer NF.

16. The system of claim 9 wherein the NF is configured for:
generating usage information indicating usage of the access token; and
sending the usage information to an NF repository function (NRF) or a network operator.

17. The system of claim 16 wherein the usage attributes of the access token are adjusted for subsequent access token requests using the usage information or wherein the usage information or related information is deleted after the access token expires.

18. A non-transitory computer readable medium having stored thereon executable instructions that when executed by at least one processor of a network function (NF) cause the NF to perform steps comprising:
receiving, from a sender, a service request comprising an access token, wherein the access token includes an access token identifier and usage attributes indicating a message rate limit, wherein the access token comprises an OAuth 2.0 access token and the usage attributes indicating the message rate limit include a claim of the OAuth 2.0 access token specifying a message rate limit or a message count limit;
after the service request is received, updating a message rate value of a rate counter for indicating a received rate of service requests associated with the access token;
determining, using the message rate limit or the message count limit specified by the claim of the OAuth 2.0 access token, that the service request should be rejected, wherein determining, using the message rate limit or the message count limit specified by the claim of the OAuth 2.0 access token that the service request should be rejected includes comparing the message rate value and the message rate limit or the message count limit specified by the claim of the OAuth 2.0 access token and determining that the message rate value exceeds the message rate limit or the message count limit specified b the claim of the OAuth 2.0 access token; and
rejecting the service request.

* * * * *

UNITED STATES PATENT AND TRADEMARK OFFICE
CERTIFICATE OF CORRECTION

PATENT NO. : 12,015,923 B2
APPLICATION NO. : 17/557324
DATED : June 18, 2024
INVENTOR(S) : Krishan et al.

It is certified that error appears in the above-identified patent and that said Letters Patent is hereby corrected as shown below:

On the Title Page

On page 2, Column 2, item (56) under Other Publications, Line 62, delete "Services:" and insert -- Services; --, therefor.

In the Specification

In Column 8, Line 26, delete "discarded" and insert -- discarded. --, therefor.

In Column 10, Line 34, delete "then" and insert -- than --, therefor.

In Column 10, Line 36, delete "then" and insert -- than --, therefor.

In Column 11, Line 27, delete "information," and insert -- information), --, therefor.

In the Claims

In Column 20, Line 59, in Claim 5, delete "NE," and insert -- NF, --, therefor.

In Column 20, Line 60, in Claim 5, delete "NE" and insert -- NF --, therefor.

In Column 21, Line 30, in Claim 9, delete "determining" and insert -- determining, --, therefor.

In Column 21, Line 56, in Claim 12, delete "NE." and insert -- NF. --, therefor.

In Column 22, Line 53, in Claim 18, delete "b" and insert -- by --, therefor.

Signed and Sealed this
First Day of October, 2024

Katherine Kelly Vidal
*Director of the United States Patent and Trademark Office*